United States Patent [19]

Potts

[11] Patent Number: 4,901,580

[45] Date of Patent: Feb. 20, 1990

[54] LOAD TESTING APPARATUS

[75] Inventor: David Potts, Leigh, England

[73] Assignee: Lifting Gear Hire Unlimited, Manchester, United Kingdom

[21] Appl. No.: 251,751

[22] Filed: Oct. 3, 1988

[30] Foreign Application Priority Data

Oct. 3, 1987 [GB] United Kingdom ............... 8723254

[51] Int. Cl.⁴ .............................................. G01N 3/00
[52] U.S. Cl. .................................... 73/788; 73/828
[58] Field of Search ................ 73/788, 826, 827, 828, 73/829, 830, 831, 832, 833, 834, 835, 837, 789, 786, 802, 158; 16/1 C

[56] References Cited

U.S. PATENT DOCUMENTS 758,418   4/1904   Cock ................................. 73/831 X
2,445,118 7/1948   Kintas ................................. 73/802

Primary Examiner—Jerry W. Myracle
Attorney, Agent, or Firm—Staas & Halsey

[57] ABSTRACT

An apparatus for applying a test load to an article (104) has upper and lower mounting members (10,12) between which the article is attached. The lower member (14) is connected via a girder (52) to a weight attachment plate (56) and beneath the plate is a plurality of weights (A to Z), each having a peg (62) which extends through a corresponding aperture in the plate.

A solenoid-actuated collar (80) mounted on the plate (56) is associated with each peg (62), and by appropriate actuation of the solenoids, one or more of the weights (A to Z) may be releasably attached to the plate (56).

The selected load may be applied to the article under test (104) by actuation of a fluid-operated ram (48) which displaces the upper mounting member (10) upwardly.

17 Claims, 5 Drawing Sheets

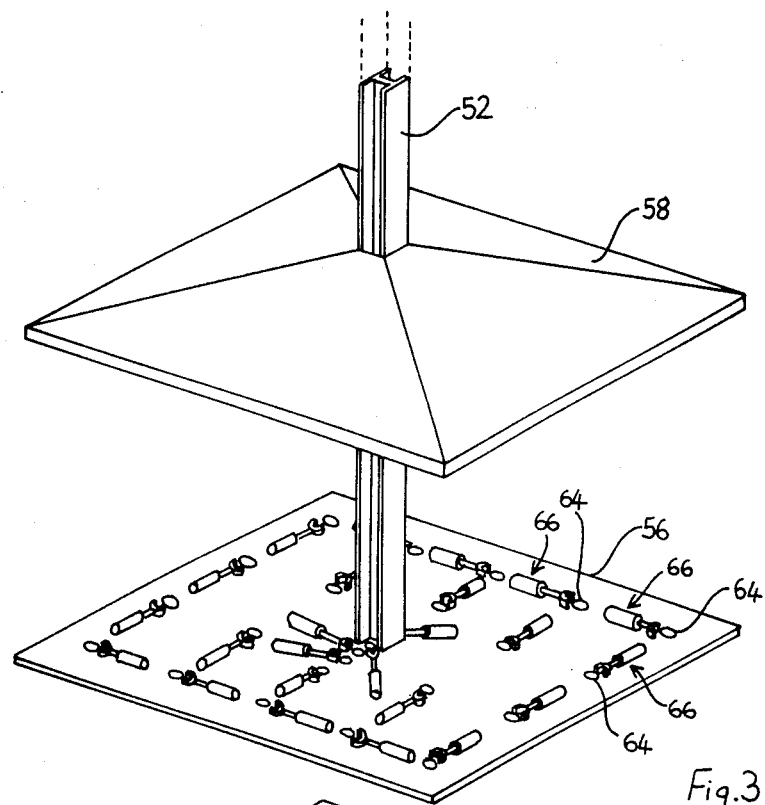
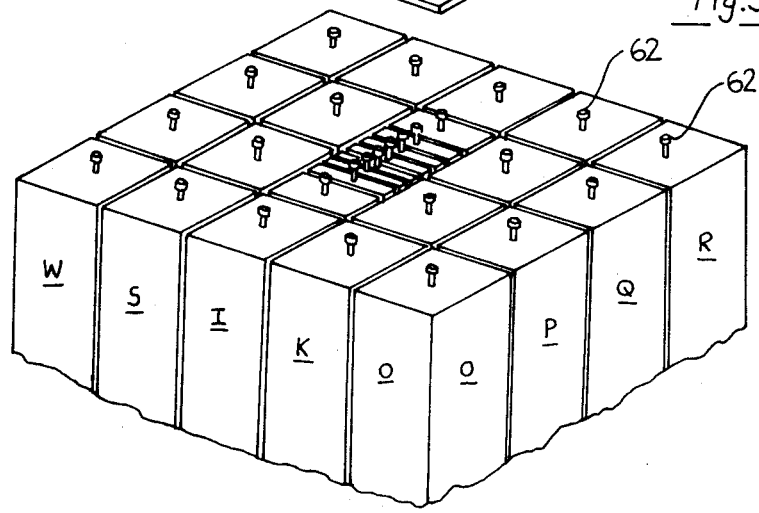
Fig. 3

Fig. 5

LOAD TESTING APPARATUS

DESCRIPTION

The present invention relates to load testing apparatus, and in particular, but not exclusively, to apparatus for applying a known load to an article to test the strength of the article.

At present, known test loads are applied to test articles in one of two ways. Firstly, and most traditionally, the article may be suspended from a robust metal frame and the load to be applied to the article is simply hung from the article under test. The applied test load may be determined simply by calculating the total weight hung from the article. For convenience, different weights are placed on a support which is hooked onto the article.

However, the test weight applied to many articles is very large, often several tons, and the weights must be lifted by fork lift truck and placed, no more than a few at a time, onto the support. Moreover, once the required weight had been applied, all the weights then have to be removed. This has the effect that testing an article with a heavy load may take several hours, and requires a skilled fork lift truck operator to apply and remove the weights. Also, there is a safety problem in that if the article under test fails, a weight of several tons will fall to the ground, which not only causes danger to personnel, but which also may cause damage to concrete floors and other prepared surfaces.

The second method is to connect the article to be tested to a fixed point and to one end of the piston of a hydraulic ram. By applying a known fluid pressure to the ram, a known load can be applied to the article under test. This method has the advantage over the first method that it is relatively easy, and very much quicker, to test an article, since it is merely necessary for a known fluid pressure to be applied to the hydraulic ram.

However, the second method suffers from the serious disadvantage that it does not apply a "live load" to the article under test. Whereas in the first method the article under test is subjected to a load similar to that which might be encountered in use (e.g. with small variations due to swinging of the weights, and also instantaneous when the weights are applied), the second method applies an artificial load. For example, the load applied by the hydraulic ram increases gradually until the designated pressure is applied, and is then applied at a virtually constant level.

Thus, although it is much quicker and more convenient, the second method can not apply a live load to an article, and consequently it is not fully accepted as a correct method of testing and certifying articles. Also, it is necessary to calibrate and re-calibrate the hydraulic ram in order to check that the correct loads are being applied.

It is an object of the present invention to provide an apparatus and method of testing articles which involves suspending a live load from the article to be tested, but which is quick and simple in operation.

In accordance with the present invention, a load testing apparatus comprises first and second article mounting members between which an article to be tested is releasably securable, and a weight attachment member to which one of the mounting members is connected, characterised by a plurality of weights disposed beneath the weight attachment member, and attachment means for releasably securing one or more of the weights to the weight attachment member.

By positioning the test weights beneath the weight attachment member, a selection of weights may be quickly and easily connected to, and disconnected from the weight attachment member. It is not necessary to move the weights onto the weight attachment member, but merely necessary to operate the attachment means to secure the necessary weights. Moreover, the apparatus ensures that a "live load" is connected to an article under test.

In a preferred embodiment, one article mounting member is positioned substantially above the other mounting member. Preferably, the lower mounting member is connected to the weight attachment member.

In a preferred embodiment, the weights are situated in a pit in the ground. This provides more working space at ground level, since the bulky weights are below ground level.

The weight attachment member may be in the form of a plate which is connected to one of the mounting members. The weights may be provided with projections which project through corresponding apertures in the plate, the weights being releasably securable to the plate by attachment means mounted on the plate which are releasably engageable with the projections on the weights. The projections may be in the form of a peg with an enlarged head, each of which is releasably engageable with a respective collar which is movable into and out of engagement with the peg.

The attachment means may be electrically operated, e.g. may be movable by means of solenoids. Alternatively, or in addition, the attachment means may be movable by means of hydraulic or pneumatic pressure.

In a preferred embodiment, there are means for displacing the mounting member not connected to the weight attachment member, so as to subject an article under test to the weights carried by the weight attachment member. The displacing means may be in the form of a fluid-actuated ram to which the said mounting member is connected.

In order that the load applied to an article under test should be substantially equal to the weight of the weights attached to the weight attachment member, the apparatus may further comprise one or more counterweights adapted to provide an upward force on the weight attachment member equal to the weight of the said one mounting member and the weight of any item connected thereto other than the weight of the releasably securable weights.

In one embodiment, the apparatus is under the control of an electronic computer or microprocessor control. The computer or microprocessor control is preferably arranged to engage a preselected combination of weights for a given total weight. This enables a well-balanced combination of weights to be used and also obviates the need for an operator to select which weights are to be engaged for a given total weight. Preferably, the apparatus further comprises sensing means associated with the attachment means, adapted to detect when each attachment means is engaged or non-engaged. Signals from the sensing means may be fed to the computer or microprocessor control to ensure that the necessary attachment means are engaged and that the other attachment means are not engaged, and to prevent further operation of the apparatus until the correct engagement and disengagement is achieved.

By way of example only, a specific embodiment of the present invention will now be described, with reference to the accompanying drawings, in which:

FIG. 3 is an exploded perspective view of a portion of the apparatus, in greater detail;

FIG. 5 is a simplified plan view of the weights used in the apparatus.

Figure 1:
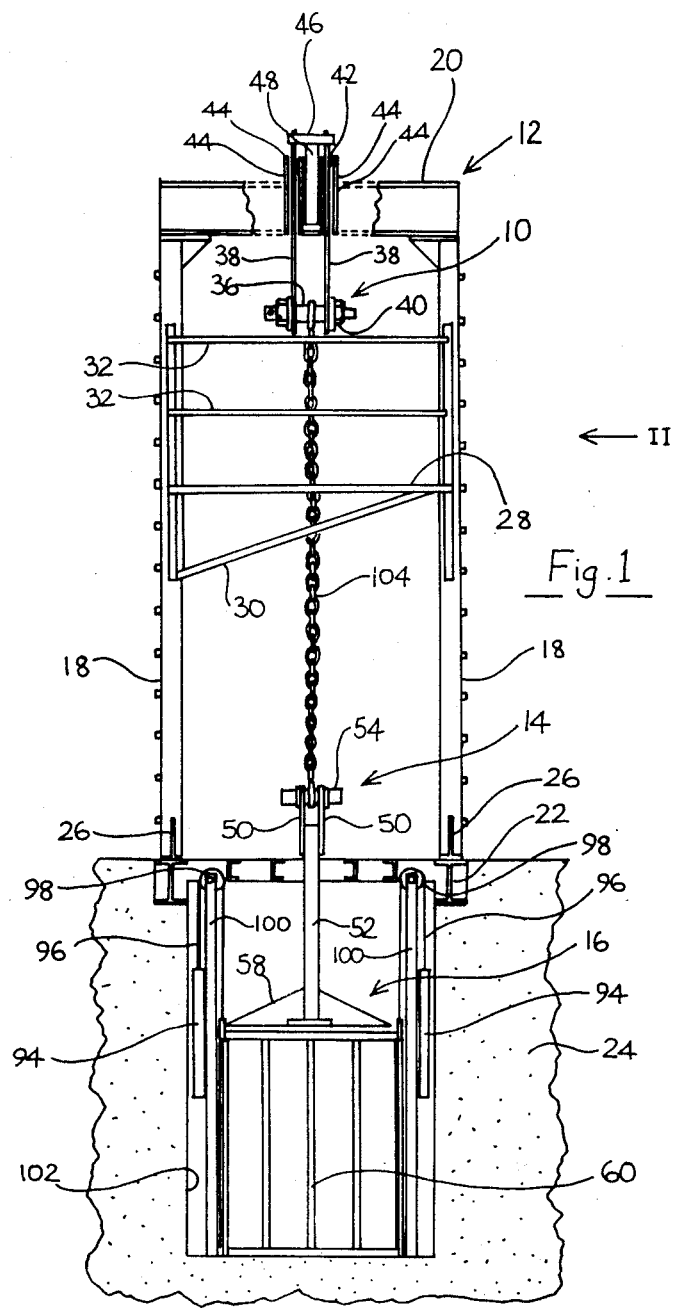
FIG. 1 is a side elevation, partly cut away, of an embodiment of testing apparatus in accordance with the present invention.
Figure 2:
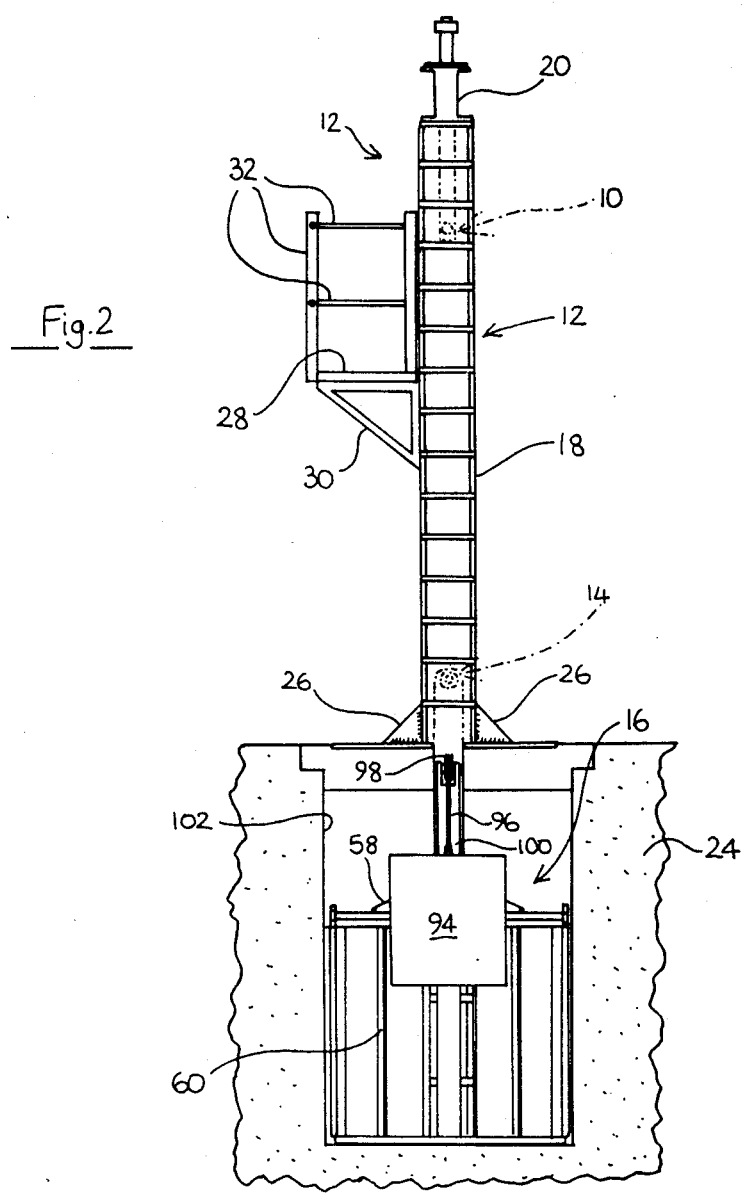
FIG. 2 is a side elevation, partly cut away, looking in the direction of arrow II in FIG. 1.

Referring firstly to FIGS. 1 and 2, the apparatus comprises an upper mounting 10 attached to a framework 12 and a lower mounting 14 which is selectively connectible to one or more of a plurality of weights 16, as will be described hereinafter. In use, an article to be tested is connected between the upper and lower mountings 10,14, and by relative displacement of the two mountings 10,14 a selection of weights 16 may be hung from the article, thereby testing that the article can withstand a certain load.

The framework 12 comprises two parallel, vertical I-section girders 18 and a horizontal I-section girder 20 secured between the upper ends of the upright girders. The lower ends of the upright girders 18 rest on two horizontal, parallel I-section girders 22 which are sunk into a concrete base 24. Triangular reinforcing flanges 26 extend between each upright 18 and the respective girder 22 on which it rests. A plaform 28 is secured across the uprights 18, just above their midpoints, and is also provided with supporting struts 30 and safety railings 34.

The upper mounting 10 takes the form of a thick suspension bolt 36 which is releasably securable to two parallel, spaced-apart suspension plates 38 by passing the bolt through aligned apertures (not illustrated) in the plates 38. The bolt may be secured by a nut 40. The suspension plates 38 pass through parallel apertures 42 in the horizontal I-section girder 20, the I-beam being reinforced in this region by means of reinforcing plates 44. The upper ends of the plates 38 project above the girder 20 and are secured to a plate 46 which is itself connected to the piston rod of a twenty-tonne hydraulic ram 48, the other end of the ram 48 being housed in a recess in the girder 20. Thus, by extension of the ram, the suspension bolt 36 is moved upwardly. Contraction of the ram causes the bolt 36 to revert to the illustrated position.

Figure 5:
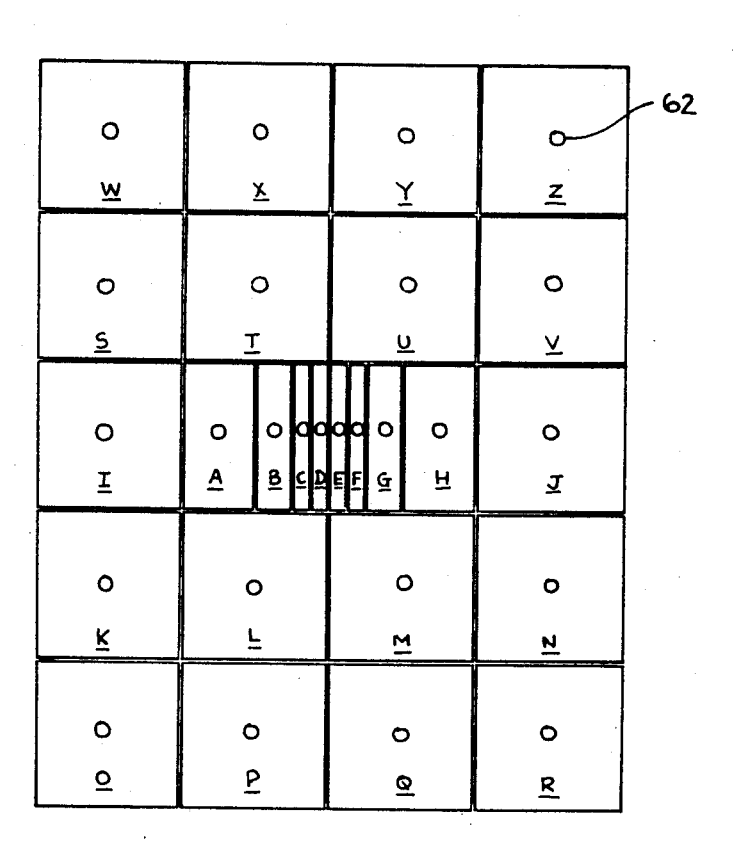

The lower mounting point 14 takes the form of two parallel, spaced-apart plates 50 which are secured to a vertically-extending girder 52. A loading bolt 54 may be inserted through aligned apertures in the plates 50. As best seen in FIG. 3, the vertical girder 52 is connected to a rectangular plate 56, which is normally convered by a quasi-pyramidal cover 58. Arranged beneath the plate 56 are twenty-six mild steel weights A to Z, a plan view of which is shown in FIG. 5. The weights are elongate and cuboidal, and are arranged in four columns and five rows. The weights are accurately cast and then machined to ensure that eighteen of the weights (I to R and S to Z) weigh one tonne. In each of the second and third columns of the third row of weights, instead of two one-tonne weights there are provided one 500 kg weight A or H, one 250 kg weight B or G and two 125 kg weights C, D or E, F. The lighter weights are positioned nearer the centre and the heavier ones further away.

Figure 4:
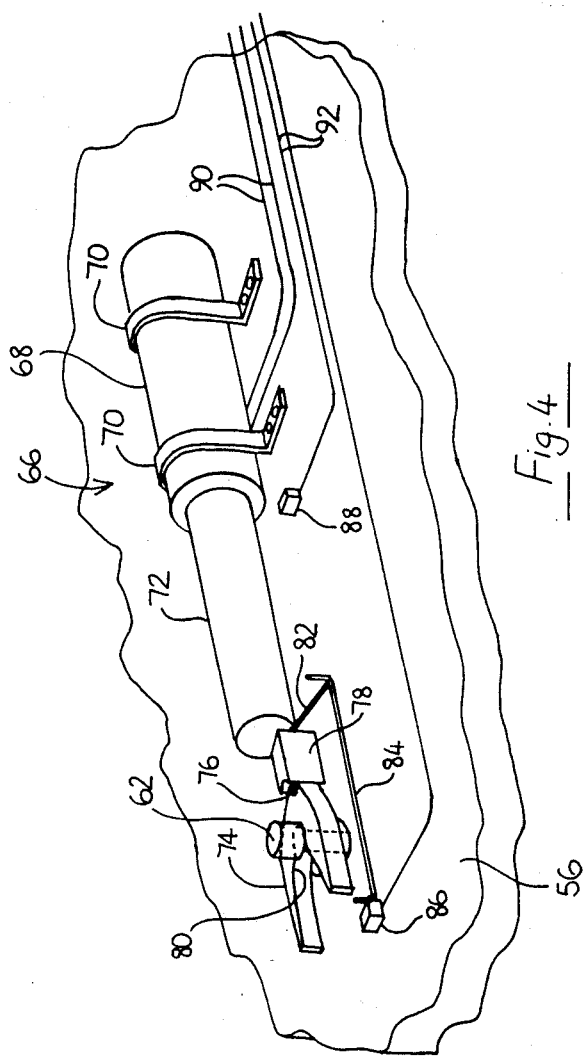
FIG. 4 is a perspective view of a securing device used in the apparatus.

The weights are housed within a metal framework 60, and, as best seen in FIG. 3, each weight A to Z has a peg 62 extending out of its upper face. Each peg 62 has a shank portion and an enlarged head portion. The rectangular plate 56 is provided with twenty-six circular apertures 64, each one positioned to receive a respective one of the pegs 62. Also associated with each aperture is a securing device 66, which may be used to releasably secure the weights A to Z to the plate 56. As best seen in FIG. 4, each securing device 66 comprises a solenoid 68 which is secured to the plate 56 by means of two retaining brackets 70. The solenoid is adapted to actuate a plunger 72, to the free end of which a securing collar 74 is pivotally connected at 76 to a mounting block 78 which is fixedly attached to the plunger 72. The collar 74 is provided with an aperture 80 which is adapted to receive the shank of a peg 62 attached to one of the weights, but which flares outwardly, as seen in FIG. 4.

In use, the plate 56 is positioned slightly above the upper surfaces of the weights A to Z, so that the pegs 62 project through the corresponding apertures 64 in the plate. By actuating the appropriate solenoid, a particular weight can be connected to the plate 56, due to the engagement of a collar with a respective peg. The locating of the collar around the peg is helped by the outwardly-flared aperture 80 of the collar and the pivotal mounting of the collar, which help to compensate for any misalignment in the apparatus. Also, a thin rod 82 is connected to the movable plunger 72, and is connected to a further rod 84 whose ends are inclined at right angles to the main portion of the rod 84. The rod 84 thus moves with the plunger, and each end is adapted to contact one of two micro-switches 86, 88, when the plunger is respectively fully extended or fully retracted. The micro-switches are thus used to confirm whether a particular plunger is extended or retracted, as will be explained more fully hereinafter.

The solenoids 68 and the micro-switches 86, 88 are connected by means of wires 90,92 to a microprocessor controlled unit which is used to select which solenoids are to be actuated. The control unit is provided with a keyboard into which an operator enters the total load to be lifted. The microprocessor control unit then actuates those solenoids which engage with those pegs 62 which are connected to the weights having a total weight equal to that selected by the operator. However, it is important that the plate 56 and girder 52 should be as balanced as possible, otherwise the weights may rub against each other, and the apparatus may be subjected to unnecessary stress. Thus, stored in the memory of the microprocessor control are the solenoids to be actuated for each weight selected (which must be a multiple of 125 kg, the smallest weight selected). The solenoids actuated for different weights selected are given in the following Table:

| KILOGRAMS | WEIGHTS SELECTED |
|---|---|
| 125 | D |
| 250 | D E |
| 375 | C EF |
| 500 | B G |
| 625 | B E G |
| 750 | BC FG |
| 875 | BC EFG |
| 1000 | A H |
| 1125 | A D H |

-continued

| KILOGRAMS | WEIGHTS SELECTED |
|---|---|
| 1250 | A DE H |
| 1375 | A C EF H |
| 1500 | AB GH |
| 1625 | AB E GH |
| 1750 | ABC FGH |
| 1875 | ABC EFGH |
| 2000 | I J |
| 2125 | I D J |
| 2250 | I DE J |
| 2375 | I C EF J |
| 2500 | I B G J |
| 2625 | I B E G J |
| 2750 | I BC FG J |
| 2875 | I BC EFG J |
| 3000 | IA HJ |
| 3125 | IA D HJ |
| 3250 | IA DE HJ |
| 3375 | IA C EF HJ |
| 3500 | IBA GHJ |
| 3625 | IBA E GHJ |
| 3750 | IABC FGHJ |
| 3875 | IABC EFGHJ |
| 4000 | KS VN |
| TO 4875, AS 4000 PLUS 125–875 | |
| 5000 | KS A H VN |
| TO 5875, AS 5000 PLUS 125–875 | |
| 6000 | KSI JVN |

The Table has only been given up to 6000 kg (out of a maximum of 20,000 kg) but it can be appreciated that higher balanced loads can be built up by appropriate selection of the solenoids to be actuated. It should also be noted that the most by which the plate 56 can be out of balance using the above selection is 125 kg, which acts at only a few centimeters from the lifting girder 52, thus producing only a small turning moment and causing negligible out-of-balance forces.

Furthermore, the weight of the girder 52, the plate 56 and the securing devices 66 is compensated by means of compensating weights 94 attached to cables 96 which pass over pulleys 98 mounted in supports 100 and which are attached to the plate 56, thereby exerting a vertically upward force on the plate. The combined weight of the compensating weights 94 is equal to the combined weight of the girder 52, the plate 56 and the securing devices 66, so that the only net forces applied to the girder 52 and plate 56 are due to the securing of one or more of the weights A to Z.

In use, the weights A to Z and the frame 60 are positioned in a pit 102 in the concrete base 24, and the girder 52 extends out of the pit. The item to be tested, for example a chain 104, is connected between the suspension bolt 36 and the loading bolt 54. The operator then keys in the testing weight on the input keyboard, for example 3750 kg, and the appropriate solenoids 68 are actuated and engage the appropriate pegs 62, which project through the apertures 64 in the plate 56. In the present example, the solenoids 68 associated with weights I,A,B,C,F,G,H and J are actuated. It should be noted that no manual selection of the solenoids to be actuated is required, since the necessary combination of solenoids for each particular weight selected has been stored previously in the microprocessor controlled unit. Thus, it is merely necessary for an operator to key in the required weight, and the appropriate solenoids are selected automatically.

The microprocessor control unit then checks that the micro-switches 86 associated with each actuated solenoid is activated and that the micro-switches 88 associated with each non-actuated solenoid is activated, thereby confirming that the necessary solenoids are correctly in position and are fully extended, and that the remaining solenoids are fully withdrawn. If the correct signals are not received from the micro-switches 86,88, it may mean that a solenoid is only partly extended or retracted, which could cause damage to the apparatus, and in such a case the microprocessor unit gives a visual warning to the operator that a fault has occurred and also prevents any further operations from occurring until the fault has been rectified.

Assuming the correct signals have been received, the required weight is secured to the plate 56 and thereby to the girder 52 and the item to be tested. As mentioned previously, the weight of the girder 52, the plate 56 and the securing devices 66 is compensated by the two counterweights 94.

In order to test the item, the operator presses a "test" button on his control panel, which thereby instructs the microprocessor control to actuate the hydraulic ram 48 situated on the horizontal cross-member 20. As mentioned previously, when the ram 48 is extended the suspension bolt 36 is moved upwardly, and since the item 104 to be tested is connected to the bolt 36 and to the loading bolt 54, the girder 52, plate 56 and the weights I,A,B,C,F,G,H and J are moved upwardly, applying a load of 3750 kg to the chain 104. The ram 48 has a stroke of about 14 inches (35.56 cm), and the load applied to the chain 104 is a "live load". Pressing a different button on the keyboard instructs the microprocessor or control unit to release the ram 48, and the load is thereby lowered to its initial position.

As an alternative to the ram 48, if the item being tested has means for raising a load, e.g. if it is a chain block, the girder 52, plate 56 and weights A to Z may be raised using that means, and the ram 48 need not be used. This allows a raising of the load by a greater amount, to a maximum of two feet six inches (0.762 m).

The invention is not restricted to the details of the foregoing embodiment. For example, instead of the combination of solenoids to be actuated for each load being stored and automatically selected, the selection of the solenoids may be manual and may be read from a list and thereafter actuated. Furthermore, the securing of the pegs 62 to the plate need not be by means of a solenoid, but may be by any other releasably securable means. For example, the collars may be hydraulically operated, and may even be movable manually, without any exterior power source. Although not as safe and convenient as the embodiment described, such modifications, especially the manual operation, would result in a less expensive apparatus, but would still have considerable advantages of cost, time, convenience and engineering preference over the prior art.

I claim:
1. A load testing apparatus comprising:
   (a) first and second article mounting members between which an article to be tested is releasably securable;
   (b) a weight attachment member to which one of said mounting members is connected;
   (c) a plurality of weights disposed beneath said weight attachment member; and
   (d) attachment means for releasably securing one or more of said weights to said weight attachment.
2. A load testing apparatus as claimed in claim 1, wherein said weights are situated in a pit.

3. A load tesing apparatus as claimed in claim 1, wherein each of said weights is provided with a projection which projects through a corresponding aperture in said weight attachment member, said attachment means being mounted on said weight attachment member and adapted to engage said projection of one or more of said weights.

4. A load testing apparatus as claimed in claim 3, wherein said projections comprise a peg with an enlarged head, and said attachment means comprises a collar movable into and out of engagement with said peg.

5. A load testing apparatus as claimed in claim 1, wherein said weight attachment member comprises a plate-like member.

6. A load testing apparatus as claimed in claim 1, further comprising displacement means for displacing the mounting member which is not connected to the weight attachment member.

7. A load testing apparatus as claimed in claim 6, wherein the displacement means comprises a fluid-actuated ram to which said mounting member is connected.

8. A load testing apparatus as claimed in claim 1, further comprising one or more counter-weights to counteract the weight of any articles other than said releasably securable weights which are attached to said weight attachment means.

9. A load testing apparatus as claimed in claim 1, wherein one of said article mounting members is mounted above the other of said mounting member.

10. A load testing apparatus as claimed in claim 9, wherein said lower mounting member is connected to said weight attachment member.

11. A load testing apparatus as claimed in claim 1, wherein said weights are arranged in a fixed formation beneath said weight attachment member.

12. A load testing apparatus as claimed in claim 1, further comprising powered means for actuating said attachment means 13. A load testing apparatus as claimed in claim 12, wherein said powered means comprises a solenoid.

14. A load testing apparatus as claimed in claim 1, comprising sensing means for determining when said attachment means is correctly actuated.

15. A load testing apparatus as claimed in claim 1, further comprising control means adapted to actuate said attachment means to releasably secure a predetermined combination of said weights to said weight attachment member for a given total weight to be secured.

16. A load testing apparatus as claimed in claim 15, wherein said control means comprises a computer or microprocessor.

17. A load testing apparatus comprising:
  (a) upper and lower article mounting members between which an article to be tested is releasably securable;
  (b) a plurality of weights disposed below said lower article mounting member;
  (c) a weight attachment member attached to said lower article mounting member and disposed between said lower article mounting member and said weights;
  (d) attachment means disposed on said weight attachment means for releasably securing one or more of said weights to said weight attachment member; and
  (e) displacement means for displacing the upper and lower article mounting members relative to each other, thereby to subject said article under test to the weight of said weights attached to said weight attachment member.

* * * * *